US009638440B2

(12) United States Patent
Payne

(10) Patent No.: US 9,638,440 B2
(45) Date of Patent: May 2, 2017

(54) SOLAR BOILER PANEL ARRANGEMENT

(71) Applicant: ALSTOM Technology Ltd., Baden (CH)

(72) Inventor: Ronald G. Payne, West Simsbury, CT (US)

(73) Assignee: ALSTOM Technology Ltd., Baden (CH)

( * ) Notice: Subject to any disclaimer, the term of this patent is extended or adjusted under 35 U.S.C. 154(b) by 1164 days.

(21) Appl. No.: 13/675,143

(22) Filed: Nov. 13, 2012

(65) Prior Publication Data
US 2014/0130792 A1    May 15, 2014

(51) Int. Cl.
*F24J 2/46* (2006.01)
*F22B 1/00* (2006.01)
*F24J 2/07* (2006.01)
*F24J 2/52* (2006.01)
*F24J 2/24* (2006.01)

(52) U.S. Cl.
CPC ............ *F24J 2/4647* (2013.01); *F22B 1/006* (2013.01); *F24J 2/07* (2013.01); *F24J 2/24* (2013.01); *F24J 2/4636* (2013.01); *F24J 2/52* (2013.01); *Y02E 10/41* (2013.01); *Y02E 10/47* (2013.01)

(58) Field of Classification Search
CPC ............................... F24J 2/4636; F24J 2/4607
USPC .................. 126/663–655, 658–662, 674
See application file for complete search history.

(56) References Cited

U.S. PATENT DOCUMENTS

| 4,245,618 A | 1/1981 | Wiener |
| 4,974,888 A * | 12/1990 | Childers ............ F16B 37/0857 |
| | | 292/251 |
| 2010/0199978 A1 | 8/2010 | Plotkin et al. |
| 2010/0199980 A1 | 8/2010 | Ricci et al. |

FOREIGN PATENT DOCUMENTS

| CN | 2267436 Y | 11/1997 |
| CN | 2268228 Y | 11/1997 |
| EP | 0106687 A2 | 4/1984 |
| EP | 0106688 A2 | 4/1984 |

\* cited by examiner

*Primary Examiner* — Avinash Savani
*Assistant Examiner* — Aaron Heyamoto
(74) *Attorney, Agent, or Firm* — Dority & Manning, P.A.

(57) ABSTRACT

A solar boiler 300 includes first and second primary receiver panels 500, 600 spaced apart by a gap 700. Each panel 500, 600 include a plurality of primary boiler tubes 510, 610 for receiving solar flux. The boiler 300 includes at least one secondary receiver arrangement 800 disposed across the gap 700 for receiving solar flux incident thereacross. The arrangement 800 includes at least one secondary boiler tube 810, and at least one support member 820 supported thereto. The arrangement 800 is configured relative to the primary panels 500, 600 such that endmost primary boiler tubes 510*a*, 610*a* are supported over the support member 820 in spaced relation 'S' to the secondary boiler tube 810 for enabling transverse and lateral thermal expansion of the tubes 510, 610, 810 without bending out. Further, a panel joining attachment 900 is provided for attaching the panels 500, 600 and the arrangement 800.

9 Claims, 3 Drawing Sheets

SOLAR BOILER PANEL ARRANGEMENT

BACKGROUND

Field of Endeavor

The present disclosure relates to solar power plants, and, more particularly, to solar boilers.

Brief Description of the Related Art

A concentrated solar power plant uses solar boilers generally including various panels of fluid-carrying tubes that are heated by focusing sunrays through thereon, in turn heating fluid to be utilized for producing electricity. Tube panel arrangement for configuring the solar boilers are quite important for effectively utilizing solar flux without any wastage or leakage and failure of tubes.

Typically, solar boilers operate on a daily cycle, shutting down in the night. During daytime, the tubes panels receive highly concentrated solar flux, while cold at night. The high solar flux and frequency of operation cycles create challenges with regard to managing thermal expansion and contraction of the tube panels. In order to overcome such challenges, various designs and methods are presented from time to time for configuring boilers. For example, to manage the challenge of expansion and contraction of the panels, two adjacent panels are spaced by a gap during configuring the solar boilers so that the panels may easily expand while intercepting the high solar flux when incident thereon. However, before such expansion of the panels, such gaps between the panels may result in substantial loss of the solar flux, known as solar leakage. Further, through such gaps between any two adjacent panels of the solar receiver, high concentrated solar flux passes, which may damage internal components of the solar receiver. Furthermore, if the adjacent panels of the boiler are arranged without any spacing or gap therebetween to avoid loss of the solar flux or damage of boilers' internal components before expansion of the panels, then there may be chances of breakage of panels or bending out of the tubes from the panels.

While previously known solar boilers may have generally been considered satisfactory for their intended purposes, there has remained a need in the art for solar boilers that can be improved to be substantially more manageable in terms of avoiding solar flux leakage and breakage of panels or bending out of tubes.

SUMMARY

The present disclosure provides a solar boiler that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a solar boiler that may be substantially more manageable in terms of preventing solar flux leakage and breakage of panels or bending out of tubes. A further aspect is to prevent internal components of the boiler from being damaged due to the concentrated solar flux that is leaked from across a gap of two adjacent solar panels. A further object of the present disclosure is to describe a solar boiler that is capable of being fabricated and assembled with relative ease. Still a further object of the present disclosure is to describe such a solar boiler that is economical to produce and to employ. Various other aspects and features of the present disclosure will be apparent from the following detailed description and claims.

In one aspect of the present disclosure, a solar boiler includes first and second primary receiver panels spaced apart by a gap. Each panel includes a plurality of substantially parallel primary boiler tubes for receiving solar flux incident thereon. Further, the boiler includes at least one secondary receiver arrangement configured to extend across the gap, in substantially parallel relation to the first and second receiver panels, for receiving solar flux incident across the gap to prevent solar flux leakage across the gap. The at least one secondary receiver arrangement includes at least one secondary boiler tube, and at least one support member supporting the at least one secondary boiler tube. The at least one secondary receiver arrangement is configured relative to the first and second primary receiver panels such that endmost primary boiler tubes are supported over the at least one support member in a spaced relation to the at least one secondary boiler tube, for enabling transverse and lateral thermal expansion of the tubes without bending out of a plane of the at least one secondary receiver arrangement.

In one embodiment, the plurality of substantially parallel primary boiler tubes and the at least one secondary boiler tube fluidly connect an inlet header to an outlet header of the respective receiver panels.

In an embodiment, the first and second primary receiver panels are substantially coplanar to each other and to the at least one secondary receiver arrangement.

In another embodiment, the at least one support member is a longitudinal fin bar supporting the at least one secondary boiler tube across its length. In one embodiment, the at least one secondary boiler tube may be coupled to the at least one support member for being supported. It is also contemplated that the at least one secondary boiler tube may be welded to the at least one support member for being supported.

Further, in a more preferred embodiment, the solar boiler includes a panel joining attachment adapted to position the at least one secondary receiver arrangement relative to the first and second primary receiver panels across the gap. In one form, the panel joining attachment includes first and second mounting members, each coupled to a backside of a respective one of the first and second panel members. The panel joining attachment further includes an intermediate mounting member coupled to a backside of the at least one secondary receiver arrangement. The intermediate mounting member is coupled to the first and second mounting member for coupling the first and second primary receiver panels to the at least one secondary receiver arrangement.

The first and second mounting member, in yet another embodiment, may include a lug for being coupled to the backside of the respective one of the first and second panel members. The lug has a through-hole configured thereon. The mounting member also includes a bracket mount having through-holes to receive the lug such that through-holes of both are concentric. The mounting member further includes a pin adapted to be inserted in the concentric through-holes of the bracket mount and the lug to couple thereto with each other. In one embodiment, the through-holes of the bracket mounts are smaller than the through-hole of the lug to enable lateral movement therebetween, in turn laterally moving the first and second receiver panels during thermal expansion thereof.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF EXEMPLARY EMBODIMENTS

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "primary," "secondary," "first," "second" and the like, herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
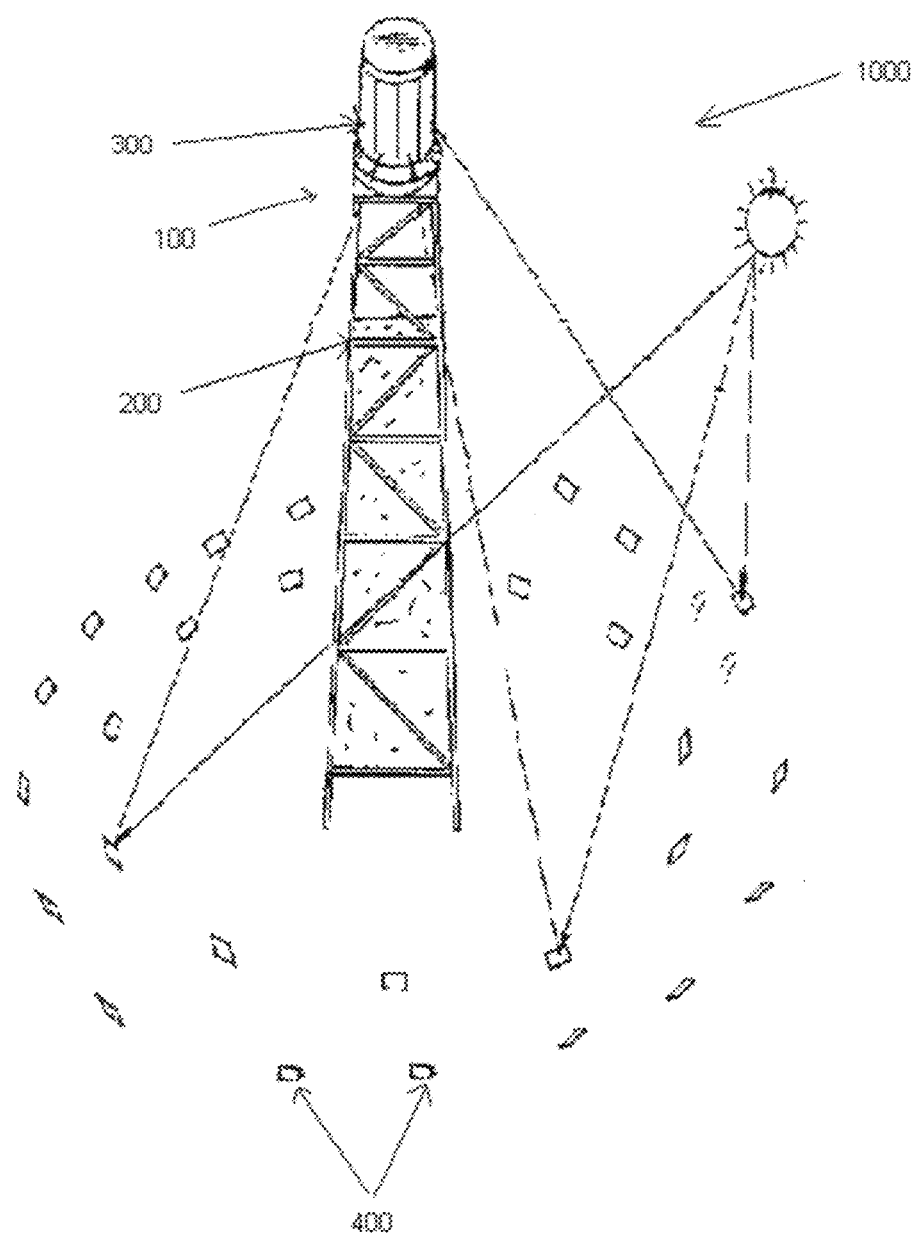
FIG. 1 illustrates a concentrated solar power plant set-up, in accordance with an exemplary embodiment of the present disclosure.
Figure 2:
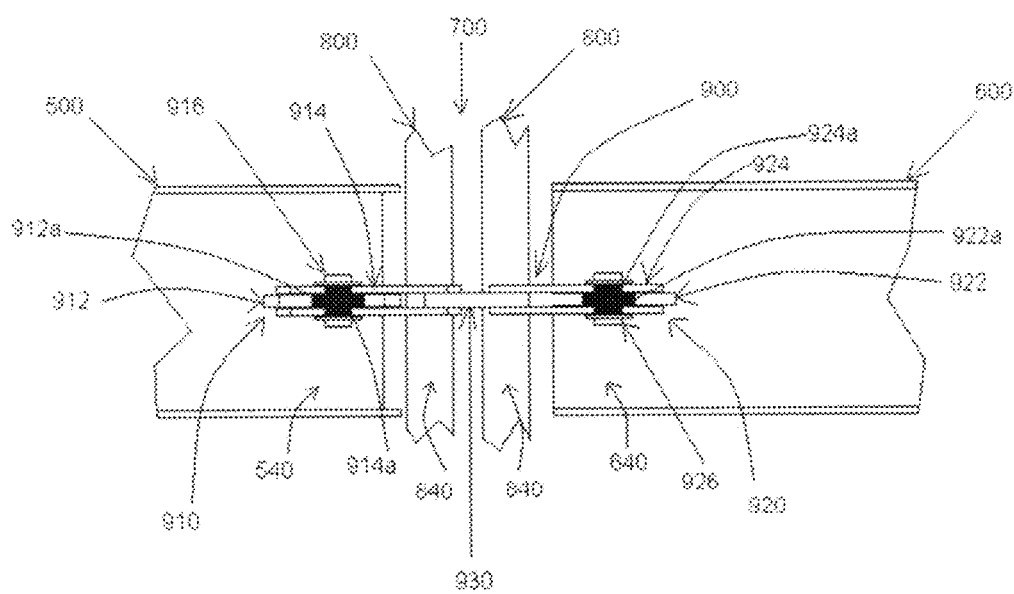
FIG. 2 illustrates a side view of panel configuration of the solar boiler, in accordance with an exemplary embodiment of the present disclosure.
Figure 3:
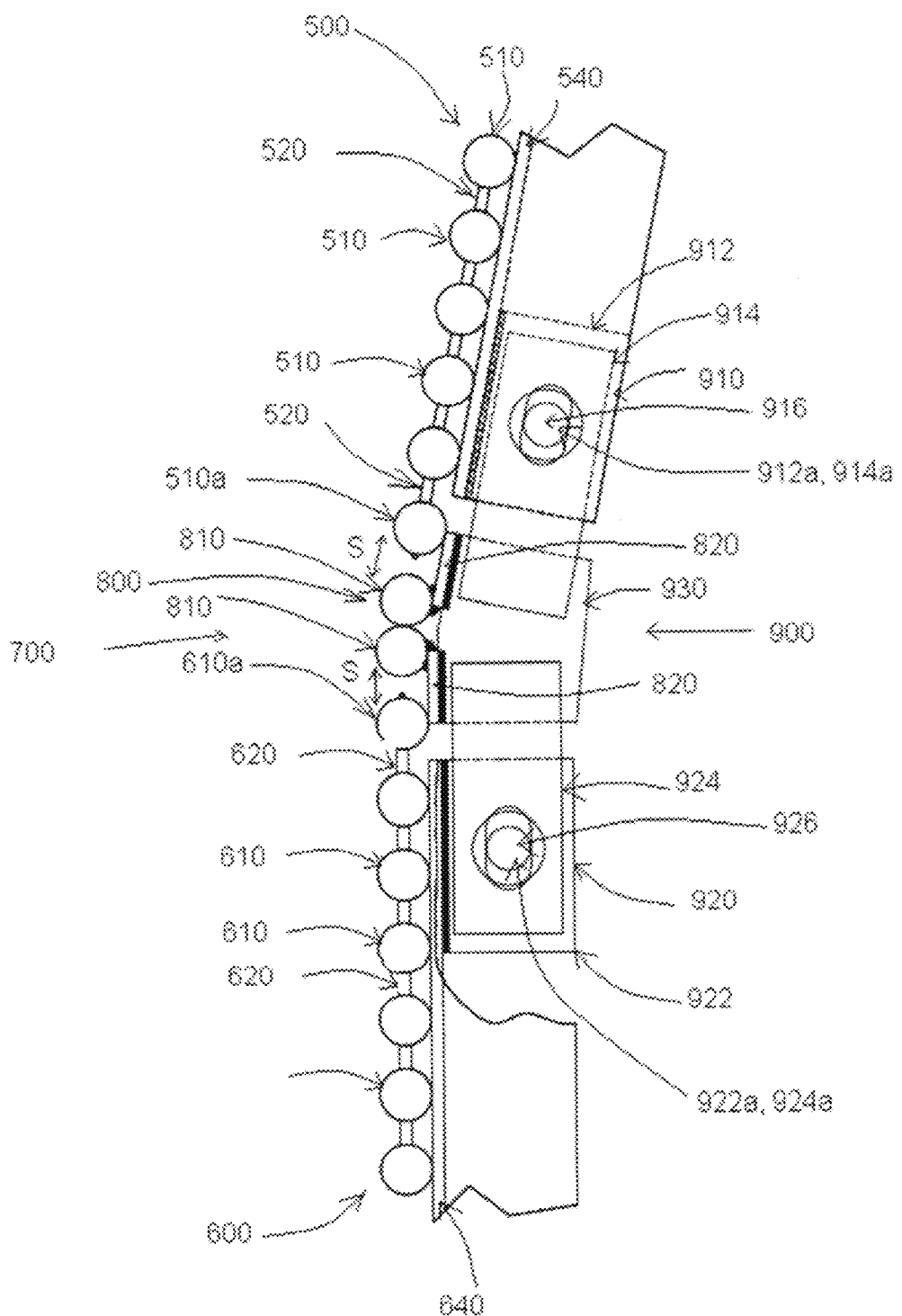
FIG. 3 illustrates top view of panel configuration of the solar boiler, in accordance with an exemplary embodiment of the present disclosure.

Referring now to FIG. 1, an example of a solar power plant set-up 1000 is illustrated in accordance with an exemplary embodiment of the present disclosure. The solar power plant set-up 1000 includes a concentrated solar tower assembly 100 having a tower structure 200 and a solar boiler 300 placed at the top thereof, where solar rays are concentrated from a heliostat 400 for production of electricity. Specifically, the solar boiler 300 includes various tubes or tube panels through which fluid flows for carrying the solar heat accumulated therein due to concentrated solar rays by the heliostat 400. In as much as the construction and arrangement of the solar power plant set-up 1000 having the tower 100, the solar boiler 300 and the heliostat 400 are all well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 2 and 3, the drawings illustrate a panel arrangement that may be successfully utilized in relation to any solar boiler, such as the solar boiler 300, as known there, in accordance with an exemplary embodiment of the present disclosure. Further, it should be understood that the tower structure 200 and the solar boiler 300 may include a variety of components for performing their assigned purpose, and only those components are shown that are relevant for the description of various embodiments of the present disclosure.

As shown in FIGS. 2 and 3, the solar boiler 300 includes first and second primary receiver panels 500, 600 (collectively may be referred to as "primary panels 500, 600"). However, without departing from the scope of the present disclosure, the solar boiler 300 may include as many numbers of such panels as required. Herein for the sake of simplicity of description, the solar boiler 300 will be described embodying the primary panels 500, 600 as shown in FIGS. 2 and 3. The primary panels 500, 600 are spaced apart by a gap 700 while configuring the solar boiler 300. Each of the primary panels 500, 600 includes a plurality of substantially parallel primary boiler tubes for receiving solar flux incident thereon. For example, the first primary panel 500 includes a plurality of primary boiler tubes 510, and the second primary panel 600 includes a plurality of primary boiler tubes 610 (collectively may be referred to as "primary tubes 510, 610").

The primary tubes 510, 610 are primarily grouped in particular numbers that are predetermined as per the need, and accordingly arranged to configure the primary panels 500, 600, respectively. Grouped primary tubes 510, 610 in the respective primary panels 500, 600 are arranged adjacent to one another. For example, the primary tubes 510 in the first primary panel 500 are arranged in such a manner that the two adjacent primary tubes 510 are coupled to each other by a tie member 520 disposed therebetween. Similarly, the primary tubes 610 in the second primary panel 600 are arranged in such a manner that the two adjacent primary tubes 610 are coupled to each other by a tie member 620 disposed therebetween. In another example, the primary tubes 510, 610 in the respective first and second primary panels 500 and 600 may be arranged in such a manner that an outer surface of one primary tube 510, 610 tangentially touches an outer surface of the adjacent primary tube 510, 610 and welded for joining with or without any tie member.

The primary tubes 510, 610 of the respective primary panels 500, 600 fluidly connect an inlet header to an outlet header (not shown) of the respective panels 500, 600 for circulating the heated fluid therefrom. The primary tubes 510 and 610 receive high concentrated solar flux that are concentrated from the heliostat 400 for heating the fluid circulating therein and therefore are subject to the thermal expansion in transverse and lateral directions. While at night or when the plant is shut off, the primary tubes 510 and 610 are subject to contraction. Therefore to manage such thermal expansion and contraction of the primary tubes 510, 610, the first and second primary panels 500 and 600 are spaced by the gap 700.

However, as discussed earlier, the gap 700 between the primary panels 500, 600 may conveniently facilitate transverse and lateral thermal expansions thereof but may result in substantial loss of the solar flux, known as solar leakage, before such expansion of the primary panels 500, 600 to close the gap 700. As also discussed earlier, such a gap allows passing high solar flux concentrated by the heliostat 400 which may damage internal components of the solar receiver 300.

The present disclosure provides a solution to the above concerns by providing at least one secondary receiver arrangement 800. The secondary receiver arrangement 800 may be configured to extend across the gap 700, in substantially parallel relation to the primary panels 500, 600, for receiving solar flux incident across the gap 700 to prevent solar flux leakage across the gap 700. In one embodiment, the secondary receiver arrangement 800 is configured with the primary panels 500, 600 in substantially coplanar relation to each other. It is also contemplated that the primary panels 500, 600 may be disposed in substantially perpendicular relationship to each other while forming the solar boiler 300, such that the gap 700 may be formed along a corner of the solar boiler 300, at which the secondary receiver arrangement 800 may be configured. However, in various other embodiments, the primary panels 500, 600 may be disposed in any relationship for forming the solar boiler 300, where the gap 700 may be maintained therebetween for configuring the at least one secondary receiver arrangement 800. Selection of numbers of the secondary receiver arrangement 800 may depend upon the width of the gap 700 between the primary panels 500, 600. In FIGS. 2 and 3, two such secondary receiver arrangements 800 are disposed in the gap 700, without affecting the scope to include more or less.

Such each secondary receiver arrangement 800 includes at least one secondary boiler tube 810 and at least one support member 820 supporting the at least one secondary boiler tube 810. In one embodiment of the present disclosure, the at least one support member 820 may be a longitudinal fin bar supporting the secondary boiler tube across its length. However, the support member 820 may be of any other shape and size, without departing from the present disclosure's scope. The secondary boiler tube 810 is coupled to the support member 820 for being supported thereon. In one embodiment, the coupling may be done via welding, without limitation of other coupling scope. Further, similar to the primary tubes 510, 610, the secondary boiler tube 810 also carry fluid to flow therefrom for carrying the solar heat accumulated therein due to concentrated solar rays by the heliostat 400 across the gap 700. Further, similar to the primary tubes 510, 610, the secondary tube 810 fluidly connects an inlet header to an outlet header (not shown) of the panels.

In a more preferred embodiment, the secondary receiver arrangement 800 is configured relative to the first and second primary panels 500, 600 across the gap 700 such that respective endmost primary tubes, such as tubes 510a and 610a, are supported over the support member 820, i.e., on fin bars, in a spaced relation 'S' to the secondary boiler tube 810. It is to be notated that the endmost tubes 510a, 610a and the secondary tubes 810 supported over the support members 820 forms a continuous tube arrangement without any path for solar leakage, between two panels, such as the primary panels 500, 600, but still provide for the tubes 510, 610, 810 to thermally expand in transverse and lateral directions due to the spacing 'S.' Further, it is also to be noted that the endmost tubes 510a, 610a supported over the support members 820 are prevented from bending out of a plane of the secondary receiver arrangement 800, during thermal expansion thereof. The support member 820 provides proper support to the endmost tubes 510a, 610a and prevents the primary panels 500, 600 from deviation or bending due to high solar flux.

The secondary receiver arrangement 800 is configured relative to the primary panels 500, 600 across the gap 700 via any suitable coupling structure. In a more preferred embodiment of the present disclosure, a panel-joining attachment 900 (which may also be referred to as 'attachment 900') is adapted to form such a coupling to position the secondary receiver arrangement 800 relative to the primary panels 500, 600. The attachment 900 couples the secondary receiver arrangement 800 to the primary panels 500, 600 across the gap 700. For doing so, the attachment 900 includes the first and second mounting members 910, 920 and an intermediate mounting member 930.

Each of the first and second mounting members 910, 920, is coupled to a backside of a respective one of the first and second primary panels 500, 600. For example, the first mounting member 910 may be coupled to a backside 540 of the first primary panel 500, and the second mounting member 920 may be coupled to a backside 640 of the second primary panel 600. In one embodiment, the first and second mounting members 910, 920 include various other components for coupling the respective first and second primary panels 500, 600.

For example, the first mounting member 910 includes a lug 912, a bracket mount 914 and a pin 916. The lug 912 may be coupled or welded to the backside 540 of the first panel member 500. The lug 912 includes a through-hole 912a configured thereon. Further, the bracket mount 914 having through-holes 914a, may receive the lug 912 such that through-holes 912a and 914a are concentric. The pin 916 may be adapted to be inserted in the concentric through-holes 912a and 914a to couple thereto with each other, in turn coupling the mounting member 910 with the first primary panel 500. Further, similar to the first mounting member 910, the second mounting member 920 also includes a lug 922, a bracket mount 924 and a pin 926. The lug 922 may be coupled or welded to the backside 640 of the second panel member 600. The lug 922 includes a through-hole 922a configured thereon. The bracket mount 924, having through-holes 924a, receives the lug 912 at concentric through-holes 922a, 924a. The pin 926 may be adapted to be inserted in the concentric through-holes 922a and 924a to couple thereto with each other, in turn coupling the mounting member 920 with the second primary panel 600. In one embodiment, the through-holes 914a, 924a of the respective bracket mounts 914, 924 may be smaller than the through-holes 912a, 922a of the respective lugs 912, 922 to enable lateral movement therebetween, in turn facilitating lateral movement of the primary panels 500, 600 upon thermal expansion thereof upon the incidence of solar flux.

The intermediate mounting member 930 may be coupled or welded to a backside 840 of the secondary receiver arrangement 800. The intermediate mounting member 930 may be further adapted to be engaged to the first and second mounting members 910, 920 for coupling the primary panels 500, 600 to the secondary receiver arrangement 800. Specifically, the intermediate mounting member 930 may be adapted to be received in the bracket mounts 914, 924 of the first and second mounting members 910, 920 for coupling the primary panels 500, 600 to the secondary receiver arrangement 800.

A solar boiler panel arrangement of the present disclosure is advantageous in various scopes. Panels of solar boilers of the present disclosure may be substantially more manageable in terms of preventing solar flux leakage and breakage of panels or the bending out of tubes upon thermal expansion thereof due to high heat flux incident thereon. The secondary receiver arrangement prevents solar flux leakage through the inside of the boiler before full expansion of the primary panels. Specifically, provision of the secondary receiver arrangement between the gap of the two primary panels prevents such solar leakage and damage of internal components of the solar boiler, as it substantially prevents the solar flux from passing through the gap. Specifically, the endmost tubes and the secondary tubes that are supported over the support members form a continuous tube arrangement without any path for solar leakage, between two panels, but still provide for the tubes to thermally expand in transverse and lateral directions due to the spacing therebetween. The solar boiler may also be capable of being fabricated and assembled with relative ease. Furthermore, the solar boiler may also be economical to produce and to employ. Moreover, apart for the aforementioned advantages, such construction method or sequences and the plant include various other advantages of today's plants and methods. Importantly, the panel joining attachment is also very advantageous in terms of conveniently and easily assembling the primary panels and secondary receiver arrangement on the site itself during construction of the boiler, precluding the need of prior assembly away from the site and then transporting to the construction site.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

REFERENCE NUMERAL LIST

1000 Solar power plant set-up
100 Concentrated solar tower assembly
200 Tower structure
300 Solar boiler
400 Heliostat
500, 600 First and second primary receiver panels; primary panels
510, 610 Primary boiler tubes of first and second primary receiver panel 500, 600
510a, 610a Endmost tunes of first and second primary receiver panel 500, 600
520, 620 Tie members of first and second primary receiver panel 500, 600
540, 640 Backsides of first and second primary panels 500, 600
700 Gap
800 Secondary receiver arrangement
810 Secondary boiler tube
820 Support member
840 Backside of the secondary receiver arrangement 800
900 Panel joining attachment, attachment
910 First mounting members of attachment 900
912 Lug of first mounting member 910
912a Through-hole on lug 912
914 Bracket mount of first mounting members 910
914a Through-holes on bracket mount 914
916 Pin
920 Second mounting members of attachment 900
922 Lug of second mounting member 920
922a Through-hole on lug 922
924 Bracket mount of second mounting members 920
924a Through-holes on bracket mount 924
926 Pin
930 Intermediate mounting member
'S' Spaced relation spacing

What is claimed is:

1. A boiler for a solar receiver, the boiler comprising:
first and second primary receiver panels spaced apart by a gap, each panel comprising a plurality of substantially parallel primary boiler tubes for receiving solar flux incident thereon; and
at least one secondary receiver arrangement extending across the gap, in substantially parallel relation to the first and second receiver panels, for receiving solar flux incident across the gap to prevent solar flux leakage across the gap, the secondary receiver arrangement comprising,
at least one secondary boiler tube, and
at least one support member, the at least one secondary boiler tube fixed to the support member,
the secondary receiver arrangement configured to the first and second primary receiver panels such that the endmost primary boiler tubes of the first and second primary receiver panels overlie the support member in a spaced relation to the secondary boiler tube, wherein upon lateral thermal expansion of the first and second primary receiver panels,
the primary boiler tubes move further over the support member towards the secondary boiler tube without bending out of a plane of the secondary receiver arrangement; and
a panel joining attachment mounting the secondary receiver arrangement to the first and second primary receiver panels across the gap comprising,
first and second mounting members, each coupled to a backside of a respective one of the first and second panel members; and
an intermediate mounting member coupled to a backside of the secondary receiver arrangement, the intermediate mounting member coupled to the first and second mounting members for coupling the first and second primary receiver panels to the secondary receiver arrangement;

wherein the first and second mounting members each comprises,
- a lug for being coupled to the backside of the respective one of the first and second panel members, the lug having a through-hole configured thereon;
- a bracket mount having through-holes, the bracket mount adapted to receive the lug such that through-holes of both are concentric; and
- a pin adapted to be inserted in the concentric through-holes of the bracket mount and the lug to couple thereto with each other;

wherein the intermediate mounting member, bracket mounts, and lugs are in a substantially linear relationship.

2. The boiler as claimed in claim 1, wherein the plurality of substantially parallel primary boiler tubes fluidly connects an inlet header to an outlet header of the respective first and second primary receiver panels.

3. The boiler as claimed in claim 1, wherein the first and second primary receiver panels are substantially coplanar to each other and to the secondary receiver arrangement.

4. The boiler as claimed in claim 1, wherein the at least one secondary boiler tube fluidly connects an inlet header to an outlet header.

5. The boiler as claimed in claim 1, wherein the at least one support member is a longitudinal fin bar supporting the secondary boiler tube along a length of the secondary boiler tube.

6. The boiler as claimed in claim 1, wherein the secondary boiler tube is welded to the support member.

7. The boiler as claimed in claim 1, wherein the through-holes of the bracket mounts are smaller than the through-hole of the lug to enable lateral movement therebetween upon thermal expansion and lateral movement of the first and second primary receiver panels relative to the support member.

8. A boiler for a solar receiver, the boiler structure comprising:

first and second primary receiver panels spaced apart by a gap, each panel comprising a plurality of substantially parallel primary boiler tubes for receiving solar flux incident thereon;

at least one secondary receiver arrangement configured to extend across the gap, in substantially parallel relation to the first and second receiver panels, for receiving solar flux incident across the gap to prevent solar flux leakage across the gap, the secondary receiver arrangement comprising,
- at least one secondary boiler tube, and
- at least one support member, the at least one secondary boiler tube fixed to the support member; and
- a panel joining attachment connecting the secondary receiver arrangement to the first and second primary receiver panels across the gap such that endmost primary boiler tubes of the first and second primary receiver panels overlie the support member in a spaced relation to the secondary boiler tube, wherein upon lateral thermal expansion of the first and second primary receiver panels, the primary boiler tubes move further over the support member towards the secondary boiler tube without bending out of a plane of the secondary receiver arrangement; and the panel joining attachment comprising,
first and second mounting members, each coupled to a backside of a respective one of the first and second primary receiver panel members, and
an intermediate mounting member coupled to a backside of the secondary receiver arrangement, the intermediate mounting member coupled to the first and second mounting members for coupling the first and second primary receiver panels to the secondary receiver arrangement;

wherein the first and second mounting members each comprises,
- a lug for being coupled to the backside of the respective one of the first and second panel members, the lug having a through-hole configured thereon;
- a bracket mount having through-holes, the bracket mount adapted to receive the lug such that through-holes of both are concentric; and
- a pin adapted to be inserted in the concentric through-holes of the bracket mount and the lug to couple thereto with each other;

wherein the intermediate mounting member, bracket mounts, and lugs are in a substantially linear relationship.

9. The boiler as claimed in claim 8, wherein the through-holes of the bracket mounts are smaller than the through-hole of the lug to enable lateral movement therebetween in turn laterally moving the first and second receiver panels while thermal expansion thereof.

* * * * *